A. J. Dye.
Excavator.
Nº 101,112.   Patented Mar. 22, 1870.
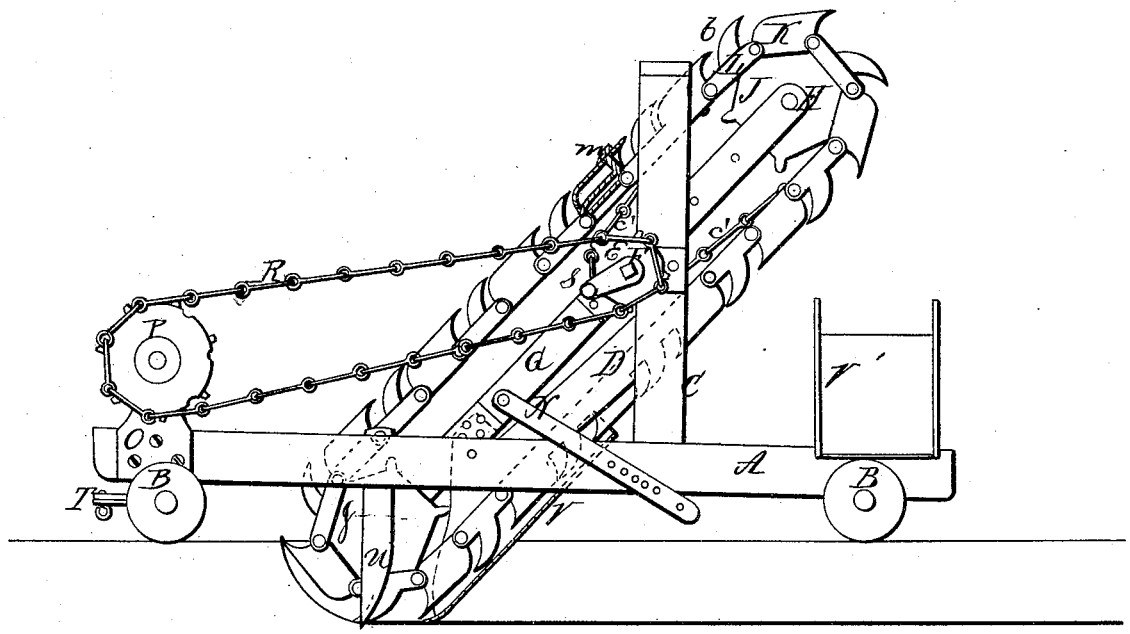
Witnesses:
Rufus R. Rhodes
H. N. Jenkins
Inventor:
A. J. Dye

United States Patent Office.

A. J. DYE, OF NEW ORLEANS, LOUISIANA.

Letters Patent No. 101,112, dated March 22, 1870.

IMPROVEMENT IN STEAM DITCHING-MACHINES.

The Schedule referred to in these Letters Patent and making part of the same.

I, A. J. DYE, of the city of New Orleans, parish of Orleans, and State of Louisiana, have invented a certain new and useful Improvement in Steam Ditching-Machines, of which the following is a specification.

The Nature and Objects of the Invention.

My invention consists of any suitable frame on wheels, on which is secured a tilting and adjustable frame that sustains a number of excavating scoops or buckets that are peculiarly formed and appointed with cutting-knives underneath the center and on both sides of each, and so linked together as to constitute an endless chain, two or more cutting-knives or blades secured to the frame near the sides of the chain, of scoops for making inclined incisions on the two lines, which, after the ditch has been dug, form the two sides thereof, a collecting scoop for the loose earth not carried off by the chain scoops in the first instance, so as to bring the same again within their action, a means for adjusting the frame on which the chain of scoops operate, and other means for giving motion to the scoops, the whole constituting, on being connected with a steam-engine, which carries it forward and operates it at the same time, a steam ditching-machine of great power and efficiency, which will cut ditches and throw up embankments with infinitely less cost and labor than any other machine of which I have any knowledge, or than can be done by hand The cutting of ditches with greater rapidity and at diminished cost is, in fact, the object sought and obtained by my invention.

The drawing presents a side elevation of my machine in one form of construction, as when engaged in the operation of cutting a ditch, there being, however, no steam-engine shown in connection with it, because I propose to employ any kind of engine, and to connect it with the machine in any proper manner and by any proper means, while, at the same time, laying no claim to such engine, except as connected with or combined with my invention.

Referring to the drawing, the machine in its separate parts and as a whole, as well as in its mode of operation, will be easily understood.

A is one of the longitudinal parts, constituting the outside of the frame, the opposite corresponding part being hidden by the same by reason of the view presented on the drawing, as are also the cross-pieces that hold the two together, and give rigidity and strength to the frame as a whole.

B are the wheels on which this frame is supported, which may be of disk-form, as shown or otherwise constructed.

Upright standards C, properly braced on one or both sides by diagonal supports, as shown at D, may or may not be secured on the frame, accordingly as the wheels B are of lesser or greater diameter, for it is obvious that if the wheels be large enough to raise the frame of the machine sufficiently above the ground to give room for a proper adjustment of the chain-scoops, when the axis on which the frame that supports the same is sustained in journals placed on the side pieces of the frame proper, there is no need for the standards C. In fact the frame shown on the drawing is merely illustrated, and I reserve the right to modify it in any and every particular if I see proper.

When the frame is substantially as shown, journals E are secured to the standards C to support a shaft, F, on which an extended frame, G, is fixed in such manner that the rotation of said shaft will not affect said frame, while, at the same time, the latter can be vibrated on the former, so as to be placed at different angles, accordingly as a deeper or shallower ditch is to be cut. At each end of the frame G, which an inspection will show to be of very simple construction, is secured, in suitable journals, a shaft, H, on which two spur-wheels J are mounted. The drawing being a side elevation, only one of these spur-wheels on each shaft is shown, but the view of these two is quite sufficient for the purpose of illustration. On these spur-wheels J the chain of scoops K is mounted and in the operation of the machine, carried forward by means of the transverse pivot-rods that link the scoops together, against which the spurs or teeth of said wheels impinge as the latter are rotated.

In order to provide a sufficient space between the scoops K to allow their cutting-edges to act efficiently, they are not linked directly together, but are separated by an intermediate part, L, from each of which parts projects a cutting-knife or blade, b, in precise line with the sides of the scoops. These blades subserve the very important function of cutting the roots which may cross the track of the machine, and hence of preventing the stoppage of the machine from such cause. Further, to subserve the same end I project the knives or cutting-blades m through the center of each scoop a few inches below the bottom thereof. The shanks of these cutting blades being secured to the bars or rods a that link the scoops together, reinforce the scoops at their weakest points, and consequently prevent their yielding under the weight of the earth in them, or from the pressure resulting from their being forced into the ground in the operation of the machine. On the drawing two scoops would be shown side by side with each other if the view did not prevent the off scoops from being seen. But this arrangement would not answer in practice unless the lands in which the ditches are to be cut are exceedingly sandy in their nature. In fact, except only for use in such lands, I should never employ a machine having more than a single scoop of the width of the ditch to be cut on any transverse line of the chain, in order to avoid leaving a ridge of earth in the center of the ditch, which, in all cases where the earth was at all tenacious in its nature, would inevitably result from the double-scoop arrangement which obtains in the machine of which the drawing is a representation.

To the frame G bars N are pivoted, as instrumentalities for adjusting the depth of the ditch to be cut, by changing the inclination of said frame, and therefore of the scoops. A series of holes in these arms, through which a pin is inserted that enters a hole in side pieces A of the frame, afford the means by which such adjustment is made.

Near the front end of the machine vertical standards O, securely fastened to the pieces A, are placed to support the axis of a spur-wheel, P, which carries an endless chain, R, connecting, as shown, with a smaller spur-wheel on the shaft F. This chain, in the operation of the machine, gives motion to the axis of spur-wheel P, and by means of a rope or chain connected to said axis at one of its ends, and, (after passing through a snatch-pulley block that is fastened to an anchor, stump, or other fixed object some distance in advance of the machine,) at its other end to the tongue T, hence pulls forward the machine in a straight line as fast as the scoops excavate the earth and form the ditch, without any direct propelling action from the steam-engine, by simply winding up the said rope or chain on said axis. The shaft F also imparts motion to the chain of scoops by means of a spur-wheel on its extremity, and another that is fixed on shaft H at the upper end of the tilting-frame G, which are connected together by a chain, $c'$. The crank S, which we may suppose to be directly connected to the steam-engine, gives motion to the shaft F, and hence, as we have seen, to all the other parts that make up the machine.

On the inside of the longitudinal pieces A of the frame of the machine the inclined knives or cutting-blades $u$ are secured in such manner as to be vertically adjustable, so as always to penetrate the ground as deep as the ditch is to be cut, whatever the depth may be. Theses blade cut inclined sides to the ditch, and thus prevent the caving in of the same.

Behind the chain of scoops and closely proximate thereto is secured a wide scoop, V, in such manner that it can always be adjusted on the same angle occupied by the former, whatever that angle may be. The functions fulfilled by scoop V is to collect the loose earth that may be left by the chain of scoops, and bank it up in such manner as to bring it again within their reach, so as to leave the ditch behind the machine entirely free of the same, and consequently in clean and symmetrical condition. The scoops K are each provided with a cover or lid to prevent the earth from falling out as they successively reverse their position in moving over the lower spur-wheel J.

In order to precipitate the excavated earth outside the ditch, a double or single incline plane, V', is placed immediately under the upper end of the chain of scoops, as shown. This incline, if single, will deliver the earth on one side of the ditch, and, by extending its length, at any desired distance from the ditch.

The operation of my machine has been sufficiently indicated by the description of its construction, so that it needs only for me to say further that it may be made of any size and power, and is equally as well adapted to throwing up embankments or levees as to cutting ditches.

The steam-engine to operate it may be connected to it by any proper means and in any proper manner.

I claim as my invention—

The combination of any suitable frame with the tilting-frame G, when the latter is sustained on a shaft, F, and is provided with shafts H, on which spur-wheels J are secured to carry the chain of scoops K, and these scoops are provided with the cutting-blades $m$, and connected together by links L, from which project the cutting-blades $b$, all the parts being constructed, arranged, and operating as herein described, for the purpose set forth.

A. J. DYE.

Witnesses:
 RUFUS R. RHODES,
 H. N. JENKINS.